United States Patent

[11] 3,578,353

[72] Inventor Robert J. Lockhart
552-C, East Central Park Ave., Anaheim, Calif. 92802
[21] Appl. No. 825,723
[22] Filed May 19, 1969
[45] Patented May 11, 1971

[54] HANDTRUCK APPARATUS
10 Claims, 4 Drawing Figs.
[52] U.S. Cl. .................................................. 280/47.2,
280/47.29, 214/370
[51] Int. Cl. ..................................................... B62b 3/02
[50] Field of Search........................................... 280/47.2,
47.27, 47.29, 47.33; 214/370

[56] References Cited
UNITED STATES PATENTS
2,606,770 8/1952 Reichert........................ 280/47.2X
2,668,721 2/1954 Wright.......................... 280/47.33X
3,003,654 10/1961 Pelto............................. 214/370

Primary Examiner—Leo Friaglia
Assistant Examiner—John A. Pekar
Attorney—Fulwider, Patton, Rieber, Lee & Utecht ABSTRACT: A handtruck apparatus comprising a vertical frame supported on a pair of support wheels and including a pair of support handles at its upper extremity. A brace is pivotally supported on its upper end from the frame and includes a third wheel carried from its bottom extremity. A spring is connected between the brace and the frame in an over-the-center-type arrangement to normally bias such brace to its retracted position adjacent the frame and, when the brace is pivoted to an intermediate position, to bias such brace to its extended supporting position. A transverse pivot rod is carried from the frame and includes a first lever arm connected with an upwardly projecting actuating handle disposed adjacent one of said support handles and a second lever arm pivotally connected with a strut which engages the lower extremity of the brace whereby raising of the actuating handle kicks the lower extremity of the strut rearwardly to pivot the brace rearwardly to said intermediate position to enable the spring to pivot it to its supporting position.

Patented May 11, 1971

3,578,353

INVENTOR.
ROBERT J. LOCKHART

BY Fulwider, Patton, Rieber,
Lee and Utecht
ATTORNEYS

HANDTRUCK APPARATUS

BACKGROUND OF THE INVENTION

1. Field of the Invention

The present invention relates to handtruck apparatus mounted on a pair of wheels and including a support brace selectively pivotable to a support position to provide three-point support for the truck.

2. Description of the Prior Art

Handtrucks have been proposed which include a third wheel carried from the truck frame and extendable to a supporting position. A truck of this type is shown in U.S. Pat. No. 2,606,770. Such trucks, however, suffer the disadvantage of requiring the operator to use one of his hands to manually extend the third wheel to its supporting position and then lock such wheel to prevent collapse thereof.

SUMMARY OF THE INVENTION

The handtruck of present invention is characterized by a brace pivotally connected on its upper end to the vertical frame of the handtruck and pivotable from a retracted position to a supporting position. Biasing means is provided for normally biasing the brace to its retracted position and is operative upon rotation of the brace to a central position to bias such brace to its supporting position. An actuating handle is coupled with the brace and is operative upon manipulation thereof to extend the brace from its retracted position to the center position thereby enabling the biasing means to fully extend the brakes to its supporting position.

An object of the present invention is to provide a handtruck apparatus of the type described which will enable the operator to extend the support brace without removing his hands from the support handles of the truck.

A further object of the present invention is to provide a truck apparatus of the type described in which the brace will be automatically retracted from its supporting position upon manipulation of the actuating handle.

Other objects and advantages of the present invention will become apparent from a consideration of the following description when taken in conjunction with the accompanying drawing.

DESCRIPTION OF THE PREFERRED EMBODIMENT

Figure 1:
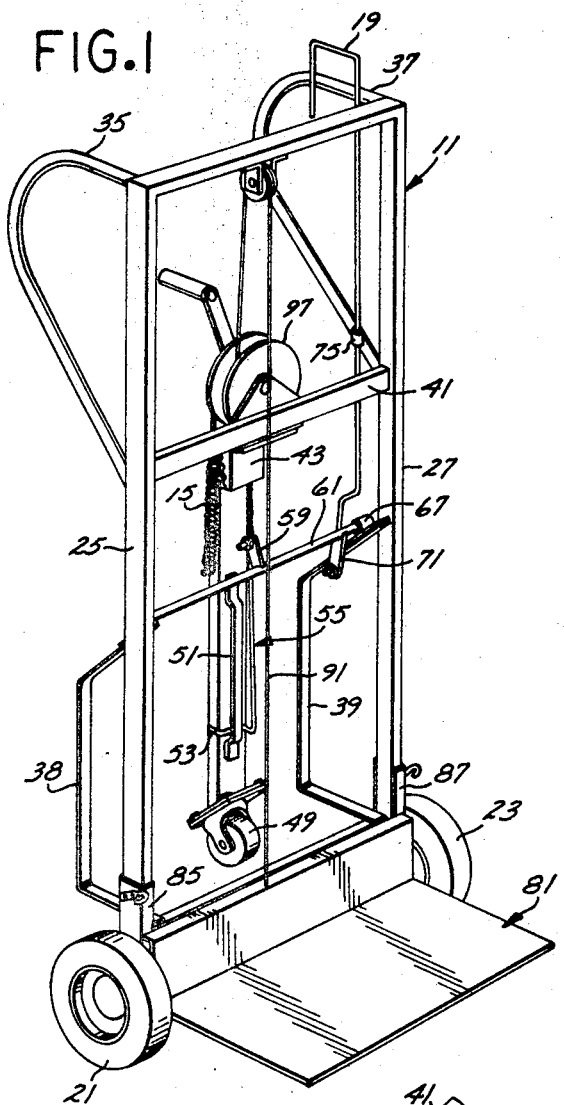
FIG. 1 is a perspective view of a handtruck apparatus embodying the present invention.
Figure 2:
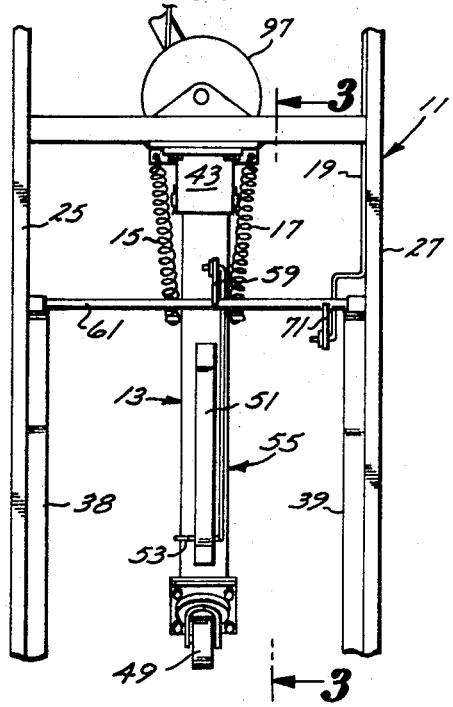
FIG. 2 is a partial front view of the handtruck apparatus shown in FIG. 1.

The handtruck apparatus of present invention includes, generally, a vertical frame 11 which has the upper end of a support brace 13 pivotally connected thereto. A pair of coil springs 15 and 17 are connected between the vertical frame 11 and the brace 13 to urge such brace in either direction from its center position shown in broken lines in FIG. 3 to thereby normally maintain such brace retracted to the position shown in FIG. 1 and to extend such brace to the supporting position shown in FIG. 4 when said brace has been pivoted rearwardly to its center position. An actuating handle 19 is coupled with the brace 13 and may be lifted to extend the brace to its center position.

The vertical frame 11 is supported from a pair of supporting wheels 21 and 23 and includes a pair of inwardly facing channels forming vertical posts 25 and 27 which are connected together on their upper extremities by an end channel 29. A pair of tubes project rearwardly from the upper extremity of the posts 25 and 27 and are looped back on themselves to form respective support handles 35 and 37. A pair of lifting handles 38 and 39 are mounted from the lower rear sides of the respective posts 25 and 27.

An intermediate crossbar 41 is supported between the posts 25 and 27 and mounts a rearwardly facing vertical channel 43 which receives the upper extremity of the brace 13, such brace being connected thereto by means of a pivot pin 47. A third wheel 49 is secured to the lower end of the brace 13 so the truck can be wheeled around while supported on such brace.

A bracket 51 is connected to the brace 13 and cooperates therewith to define a slide for receiving a transverse follower 53 formed by the lower extremity of a strut, generally designated 55. The upper end of the strut 55 is pivotally connected to a lever arm 59 carried on a transverse pivot rod 61 which has its opposite extremities journaled in bearings 65 and 67 supported from the lifting handles 38 and 39. A second lever arm 71 extends radially from the pivot rod 61 and is connected with the handle 19 which is formed by a rod that projects upwardly through a bracket 75 supported from the support handle 35 and then bends rearwardly and turns back on itself.

A lifting platform, generally designated 81 is supported on the front of the frame 11 and includes a rearwardly facing channel 83 carried from a pair of inwardly facing channels 85 and 87 that are slideably received over the respective vertical posts 25 and 27. A lifting cable 91 is connected centrally with the rearwardly facing platform channel 83 and extends upwardly to thread over a pulley 85 supported from the top frame channel 29. The cable 91 is wound on a winch 97 supported from the intermediate crossmember 41.

Mounted on the underside of the platform 81 is a centrally disposed caster wheel 98 which cooperates with the two main wheels 21 and 23 when the platform 81 is lowered and the truck is in its upright position so such truck can be maneuvered around.

In operation, the truck may be moved into position adjacent a load and the platform 81 positioned under such load in a conventional manner. The upper extremity of the truck may then be pivoted back to cause the load to lean against the vertical frame 11 and such truck may then be pushed forward to convey the load.

If desired, the platform 81 may then be left in its lowered position with the caster 98 serving to support the front end thereof so the truck may be wheeled about in its upright position.

Figure 3:
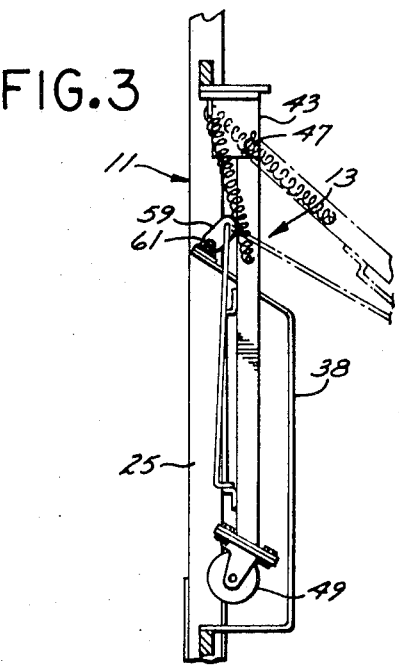
FIG. 3 is a vertical sectional view taken along the line 3–3 of FIG. 2.

When it is desirable to leave the load supported on the truck, the operator may grasp the actuating handle 19 with his left hand and pull it upwardly to pivot the pivot rod 61 counterclockwise as viewed in FIG. 3. Such counterclockwise pivoting of the lever arm 59 will cause the upper extremity of the strut 55 to be carried forward causing the intermediate portion of such strut to engage the pivot rod 61 thus pivoting said strut about such rod to kick the lower extremity of such strut rearwardly to its center position shown in broken lines in FIG. 3. Once the brace 13 passes such center position, the coil springs 15 and 17 will urge the lower extremity of such brace rearwardly until the follower 53 strikes the upper end of the slide 51. The brace will then be in its supporting position and the truck may be leaned rearwardly on the third wheel and may be pushed forwardly or rearwardly as desired.

Figure 4:
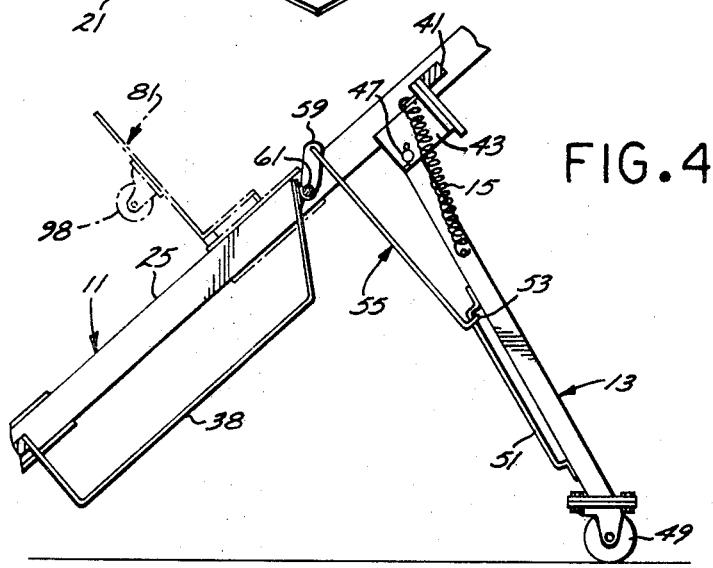
FIG. 4 is a side view of the handtruck apparatus shown in FIG. 1.

When it is desirable to retract the support brace 13, the truck may be lifted to a more upright position then that shown in FIG. 4 and the actuating handle 19 pushed downwardly to rotate the lever arm 59 clockwise from the position shown in FIG. 4. Such rotation of the lever arm 59 will pivot the brace inwardly to the center position shown in broken lines in FIG. 3 thus imparting sufficient momentum to the brace 13 to carry it by such center position and enable the compression springs 15 and 17 to fully retract it to the position shown in FIG. 1. It is of particular importance that the extension and retraction of the supporting brace 13 can be accomplished without the operator removing his hand from the supporting handle 31.

It will be further observed that when it is desirable to raise the load to a desired level, the winch 97 may be operated to move the lifting platform 81 upwardly on the frame 11.

From the foregoing detailed description it will be apparent that the handtruck apparatus of present invention provides a convenient and sturdy means for conveying a load. Such handtruck may be conveniently actuated to support itself in a three-point stance and can have its brace retracted without the operator removing his hand from the support handle.

Various modifications and changes may be made with regard to the foregoing detailed description without departing from the spirit of the invention.

I claim:

1. Handtruck apparatus comprising:
a vertical frame having, at least, one support handle on its upper extremity and including a pair of wheels;
a brace pivotally supported on its upper extremity from said frame, said brace being pivotal between a retracted position, a center position, and a supporting position;
limit means interconnecting said brace and frame for holding said brace in its supporting position;
bias means normally biasing said brace to its retracted position and operative when said brace is pivoted outward to said center position to pivot said brace to its supporting position; and
an actuating handle coupled with said brace whereby said handle may be manipulated to overcome said bias means to pivot said brace to said center position and enable said bias means to pivot said brace to said supporting position.

2. Handtruck apparatus as set forth in claim 1 wherein:
said brace includes a longitudinal slide; and
said limit means includes a strut pivotally connected on one end to said frame and formed on its opposite end with a follower received in said slide and engageable with one end thereof to limit rotation of said brace.

3. Handtruck apparatus as set forth in claim 1 wherein:
said limit means includes a strut coupled with said actuating handle for pulling said brace inwardly to said center position when said handle is pulled while said brace is in its supporting position.

4. Handtruck apparatus as set forth in claim 1 wherein:
said limit means includes a pivot rod supported from said frame and coupled with said actuating handle, said rod being formed with an upwardly projecting lever arm, extending downwardly over said pivot rod, and engaged on its lower end with said brace, whereby raising of said actuating handle will pivot said strut about said pivot rod and force the lower extremity of said brace outwardly past said center position.

5. Handtruck apparatus as set forth in claim 1 that includes:
a lifting platform supported from said frame; and
lifting means for raising and lowering said platform.

6. Handtruck apparatus as set forth in claim 5 that includes:
a caster wheel mounted on the underside of said platform for cooperating with said pair of wheels to support said truck in an upright position when said platform is in its lowered position.

7. Handtruck apparatus as set forth in claim 1 wherein:
said actuating handle is disposed adjacent said support handle.

8. Handtruck apparatus as set forth in claim 1 wherein:
said brace includes a longitudinal slide; and
said limit means includes a horizontal pivot rod mounted on said frame and coupled with said actuating handle, said rod including an upwardly projecting lever arm, a strut pivotally connected with said lever arm and extending downwardly over said pivot rod and formed on its lower end with a follower received within said slide whereby raising of said handle will pivot said strut about said pivot rod and kick the lower extremity of said brace out past said center position to enable said bias means to move said brace to its supporting position.

9. Handtruck apparatus as set forth in claim 8 wherein:
said lever arm is arranged to project forwardly of said pivot rod when said brace is in its supporting position whereby raising of said actuating handle will pivot said brace inwardly past said center position.

10. Handtruck apparatus as set forth in claim 1 that includes:
a third wheel carried on the lower extremity of said brace.